(12) United States Patent
Watanabe et al.

(10) Patent No.: US 8,391,004 B2
(45) Date of Patent: Mar. 5, 2013

(54) LATCHING MODULE

(75) Inventors: Masahide Watanabe, Tokyo (JP);
Rintaro Kato, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 185 days.

(21) Appl. No.: 13/040,488

(22) Filed: Mar. 4, 2011

(65) Prior Publication Data

US 2011/0267746 A1 Nov. 3, 2011

(30) Foreign Application Priority Data

May 3, 2010 (JP) ................................. 2010-049445
Jun. 29, 2010 (JP) ................................. 2010-147500

(51) Int. Cl.
*G06F 1/16* (2006.01)
*H05K 5/00* (2006.01)
*H05K 7/00* (2006.01)

(52) U.S. Cl. .......... 361/679.58; 361/679.38; 361/679.55

(58) Field of Classification Search .......... 361/679.33–679.45, 679.55, 679.58
See application file for complete search history.

(56) References Cited

U.S. PATENT DOCUMENTS

| | | | |
|---|---|---|---|
| 6,185,103 B1 | 2/2001 | Yamada | |
| 6,356,436 B1 * | 3/2002 | Buican et al. | 361/679.58 |
| 6,952,341 B2 * | 10/2005 | Hidaka et al. | 361/679.32 |
| 7,040,908 B2 * | 5/2006 | Kamata | 439/159 |
| 7,080,995 B2 * | 7/2006 | Cheng | 439/138 |
| 7,123,487 B2 * | 10/2006 | Saito et al. | 361/801 |
| 7,445,477 B2 * | 11/2008 | Ting et al. | 439/159 |
| 7,781,691 B2 * | 8/2010 | Chen | 200/343 |
| 2006/0126288 A1 * | 6/2006 | Chen et al. | 361/685 |
| 2006/0133030 A1 * | 6/2006 | Takahashi et al. | 361/685 |
| 2006/0139871 A1 * | 6/2006 | Chen et al. | 361/685 |
| 2007/0019379 A1 * | 1/2007 | Hsiao | 361/685 |
| 2007/0211422 A1 * | 9/2007 | Liu et al. | 361/685 |
| 2007/0235305 A1 * | 10/2007 | Chen | 200/296 |

(Continued)

FOREIGN PATENT DOCUMENTS

JP 2000-82884 A 3/2000

*Primary Examiner* — Adrian S Wilson
(74) *Attorney, Agent, or Firm* — Holtz, Holtz, Goodman & Chick, PC

(57) ABSTRACT

A latching module is configured to be attached and fixed to a unit. The unit is designed to be detachably installed in an electronic apparatus along a predetermined direction. The electronic apparatus has an engaged portion. The latching module comprises a base member, an operative member, a locking member, a lock urge member and a release mechanism. The base member is formed with a cam groove. The base member is configured to be fixed to the unit so that the base member is unable to move relative to the unit. The operative member is supported by the base member so as to be projectable outwardly in the predetermined direction from the latching module. The locking member has an engagement portion and a pivot portion. The engagement portion is to be engaged with the engaged portion. The locking member is supported by the base member so that the engagement portion is pivotable on the pivot portion from an engaged position to a released position. The engaged position is a position where the engagement portion is able to be engaged with the engaged portion. The released position is a position where the engagement portion is unable to be engaged with the engaged portion. The lock urge member is arranged to urge the locking member toward the engaged position. The release mechanism is designed to force the locking member to pivot on the pivot portion to the released position upon the projection of the operative member.

15 Claims, 15 Drawing Sheets

U.S. PATENT DOCUMENTS

| | | | |
|---|---|---|---|
| 2008/0112126 A1* | 5/2008 | Hsu | 361/685 |
| 2008/0130215 A1* | 6/2008 | Mortensen et al. | 361/684 |
| 2008/0132120 A1* | 6/2008 | Tsai | 439/630 |
| 2008/0266780 A1* | 10/2008 | Olesiewicz et al. | 361/685 |
| 2008/0316176 A1* | 12/2008 | Deutsch et al. | 345/168 |
| 2008/0316684 A1* | 12/2008 | Kilpinen | 361/679 |

* cited by examiner

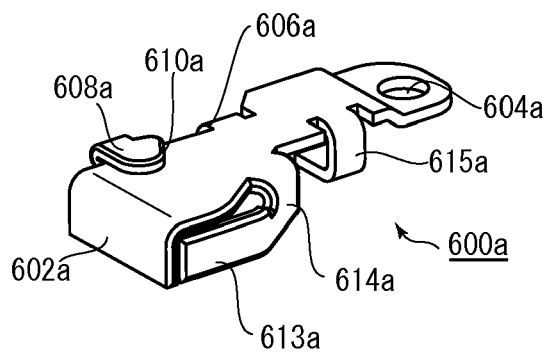
F I G. 27
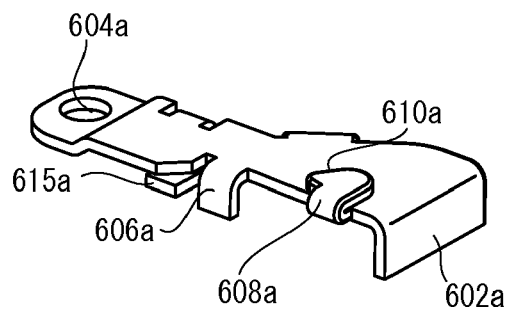
F I G. 28
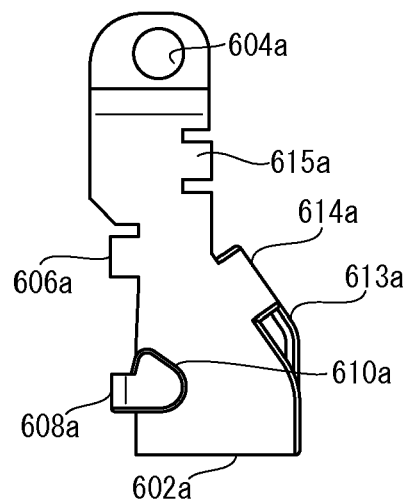
F I G. 29

LATCHING MODULE

CROSS REFERENCE TO RELATED APPLICATIONS

Applicants claim priority under 35 U.S.C. §119 of Japanese Patent Applications No. JP2010-049445 filed Mar. 5, 2010 and No. JP2010-147500 filed Jun. 29, 2010.

BACKGROUND OF THE INVENTION

This invention relates to a latching module configured to be attached to a unit which is designed to be detachably installed in an electronic apparatus so as to maintain the attached state of the unit to the electronic apparatus.

When an attachable and removable unit like a hard disk drive is attached to an electronic apparatus like a notebook computer, a latching mechanism is usually used to maintain the attached state of the unit to the electronic apparatus. This type of the unit includes an optical disk drive like a CD-ROM drive and a DVD-ROM drive, other device unit to record or store information, a battery unit and so on. For example, the latching mechanism is disclosed in JP-A 2000-82884, the contents of which are incorporated herein by reference.

Recently, a latching mechanism which includes a release mechanism to release the latch is known. The latching mechanism has an operative member like a handle and so on. The operative member is linked to the release mechanism. The operative member protrudes from the latching mechanism toward a direction in which the unit is removed from the electronic apparatus. The operative member is pulled so that the unit is removed from the electronic apparatus. The above-mentioned latching mechanisms are roughly divided into two types in view of specific structures. The first type latching mechanism is configured to be incorporated into the electronic apparatus. The second type latching mechanism is configured to be attached to the unit.

As for the first type latching mechanism, the electronic apparatus is required to include a power transmission mechanism internally so as to transmit a power which pulls the operative member to a member which forces the unit to be ejected or removed. As for the second type latching mechanism, the operative member is attached to the unit with the latching mechanism so that a force applied to the operative member is used directly to eject or to remove the unit. Therefore, the electronic apparatus is not required to include the power transmission mechanism. The former electronic apparatus with the first type latching mechanism has a region occupied by the power transmission mechanism. On the other hand, in the latter electronic apparatus corresponding to the second type latching mechanism, this region can be used to place other members and so on. Therefore, the inner space of the latter electronic apparatus may be used more effectively as compared with the inner space of the former electronic apparatus.

SUMMARY OF THE INVENTION

It is therefore an object of the present invention to provide a latching module which can be used for the second type latching mechanism (the latching mechanism configured to be attached to the unit). The latching module according to the present invention has a reduced size so that the inner space of the electronic apparatus is used more effectively.

One aspect of the present invention provides a latching module configured to be attached and fixed to a unit. The unit is designed to be detachably installed in an electronic apparatus along a predetermined direction. The electronic apparatus has an engaged portion. The latching module comprises a base member, an operative member, a locking member, a lock urge member and a release mechanism. The base member is formed with a cam groove. The base member is configured to be fixed to the unit so that the base member is unable to move relative to the unit. The operative member is supported by the base member so as to be projectable outwardly in the predetermined direction from the latching module. The locking member has an engagement portion and a pivot portion. The engagement portion is to be engaged with the engaged portion. The locking member is supported by the base member so that the engagement portion is pivotable on the pivot portion from an engaged position to a released position. The engaged position is a position where the engagement portion is able to be engaged with the engaged portion. The released position is a position where the engagement portion is unable to be engaged with the engaged portion. The lock urge member is arranged to urge the locking member toward the engaged position. The release mechanism is designed to force the locking member to pivot on the pivot portion to the released position upon the projection of the operative member.

An appreciation of the objectives of the present invention and a more complete understanding of its structure may be had by studying the following description of the preferred embodiment and by referring to the accompanying drawings.

BRIEF DESCRIPTION OF THE DRAWINGS

FIG. 27 is a perspective view showing a locking member of the latching module of FIG. 20.

FIG. 28 is a perspective view showing the locking member of FIG. 27 as seen from another direction.

FIG. 29 is a top view showing the locking member of FIG. 27.

Figure 1:
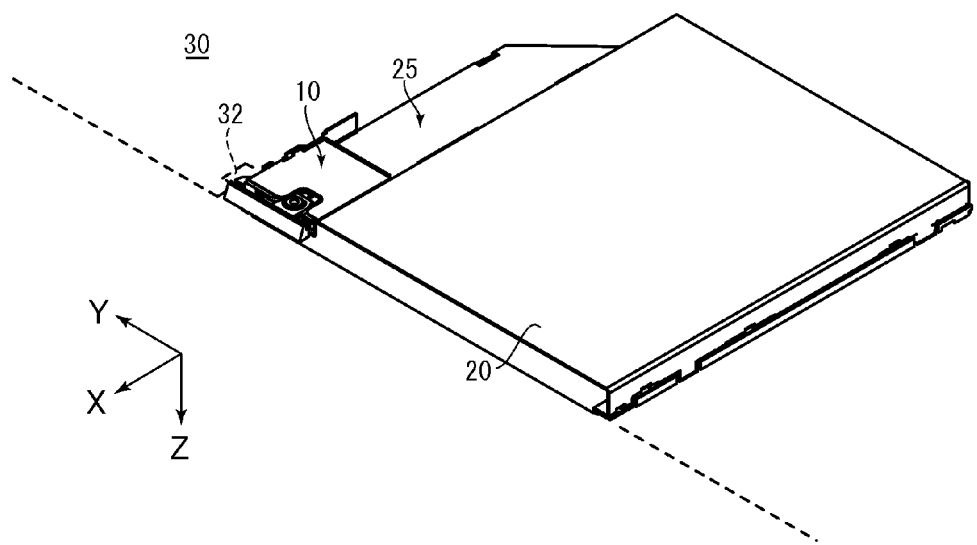
FIG. 1 is a perspective view showing a positional relation between an electronic apparatus and a unit which is provided with a latching module according to a first embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

First Embodiment

Figure 2:
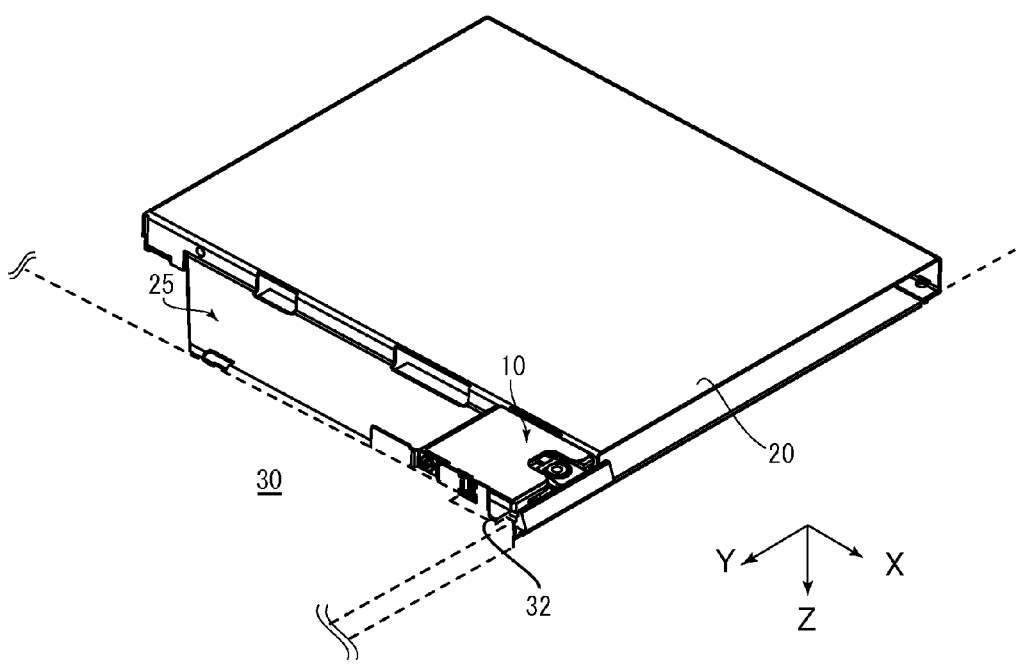
FIG. 2 is a perspective view showing the positional relation between the electronic apparatus and the unit of FIG. 1 as seen from another direction.

Referring to FIGS. 1 and 2, a latching module 10 according to a first embodiment of the present invention is configured to be attached and fixed to a unit 20. The unit 20 is designed to be detachably installed in an electronic apparatus 30 along the X-direction (predetermined direction). The latching module 10 is configured to be pulled out of the electronic apparatus 30 along with the unit 20 when the unit 20 is removed from the electronic apparatus 30. As for this type of a latching module 10, the electronic apparatus 30 is required to have a predetermined region where the latching module 10 is placed when the unit 20 is attached to the electronic apparatus 30. As a result, the electronic apparatus 30 is provided with a space 25 behind the predetermined region. If the latching module 10 is reduced in size in a front to rear direction (X-direction), it is possible to enlarge the space 25 behind the latching module 10. For example, the enlarged space 25 can be used to place parts or electric circuits of the electronic apparatus 30 so that the electronic apparatus 30 may be totally reduced in size.

The illustrated electronic apparatus 30 is a notebook computer. The electronic apparatus 30 has an engaged portion 32 formed on a chassis and so on. The engaged portion 32 is able to be engaged with an engagement portion (described later) of the latching module 10. The illustrated unit 20 is an optical disk drive. The unit 20 is roughly drawn in FIGS. 1 and 2. The latching module 10 according to the present invention is applicable to various devices in addition to the notebook computer or the optical disk drive described above. For example, the electronic apparatus 30 may be a peripheral device for the notebook computer, and the unit 20 may be a battery unit or another recording device unit.

Referring to FIGS. 3 to 8, the latching module 10 according to the present embodiment includes a base member 100 made of an insulating material, an operative member 200 made of an insulating material, a pressing member 300 made of a metal, a guide shaft 400 made of a metal, a spring (projection urge member) 500, a locking member 600 made of a metal, a pivot axle (pivot pin) 700, a helical torsion coil spring (lock urge member) 800 and a shell 900 made of a metal. The base member 100 is configured to be fixed to the unit 20. The operative member 200 is supported by the base member 100. The pressing member 300 is attached to the operative member 200. The spring 500 is supported by the base member 100. The locking member 600 is retained by the base member 100. The shell 900 covers (at least in part) the base member 100 and covers most of the other members of the latching module 10. The base member 100 is fixed to the unit 20 as described above so that the base member 100 is unable to move relative to the unit 20. Therefore, when a force is applied to the base member 100, the force is immediately applied to the unit 20.

Figure 9:
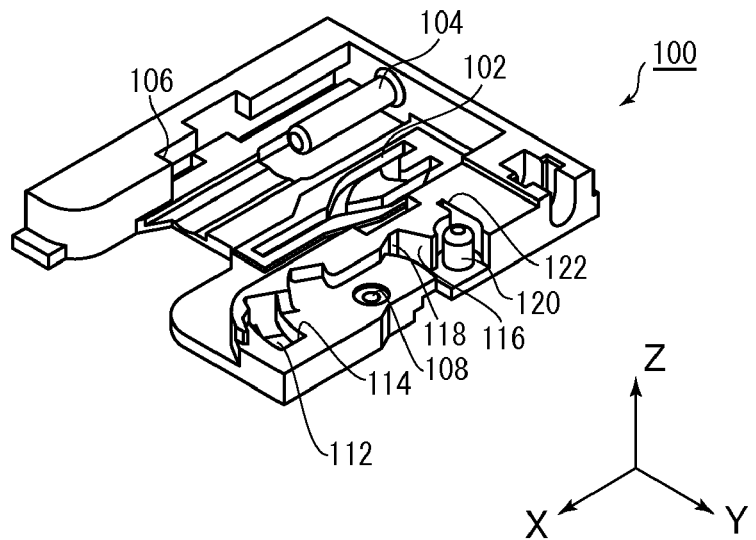
FIG. 9 is a perspective view showing a base member of the latching module of FIG. 4.
Figure 10:
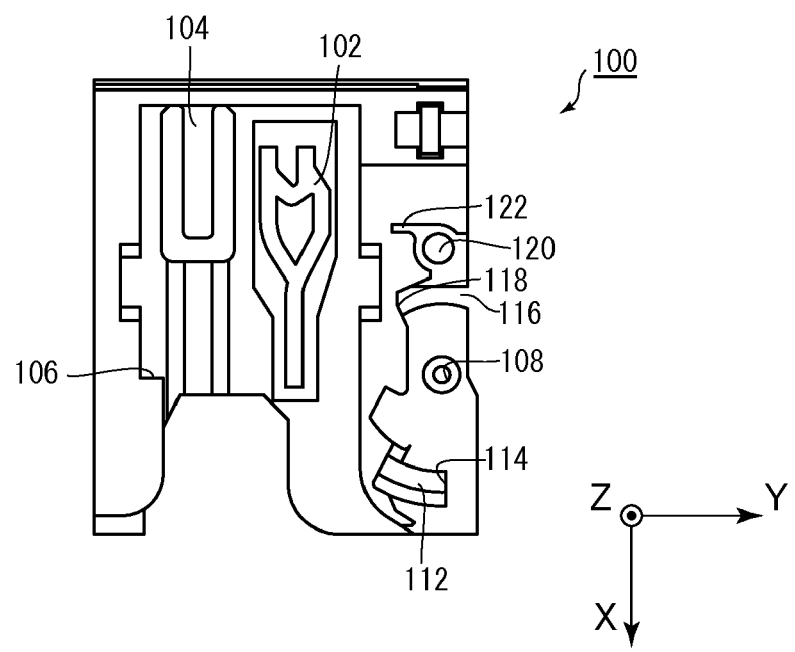
FIG. 10 is a top view showing the base member of FIG. 9.
Figure 14:
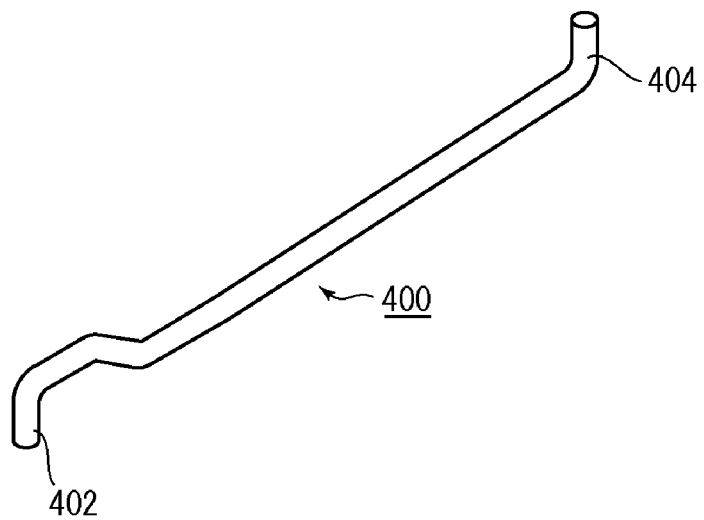
FIG. 14 is a perspective view showing a guide shaft of the latching module of FIG. 4.

As shown in FIGS. 9 and 10, the base member 100 is formed with a cam groove 102. The illustrated cam groove 102 is to form a so-called "heart cam". The cam groove 102 defines an island-like part formed with a side surface. The side surface of the island-like part functions as a cam surface. As shown in FIG. 14, the guide shaft 400 has opposite ends 402 and 404. The one end 404 is received by the cam groove 102 so as to be movable in the cam groove 102. In other words, the end 404 of the guide shaft 400 functions as a cam follower which follows the cam surface of the cam groove 102. The cam groove 102 and the guide shaft 400 form a so-called "push-push mechanism" together with the operative member 200.

Referring to FIGS. 9 and 10, the base member 100 is formed with a support pole 104 beside the cam groove 102. The support pole 104 extends forwardly along the X-direction (predetermined direction) from a rear end of the base member 100. The support pole 104 is configured to be inserted into the helical spring 500 so as to support the spring 500 (for example, see FIGS. 7 and 8). The base member 100 has opposite side portions. The side portion adjacent to the support pole 104 is formed with a shoulder-like portion. The shoulder-like portion is positioned diagonally from a front side of the support pole 104. The shoulder-like portion protrudes inwardly in a width direction of the base member 100 (Y-direction) so that the shoulder-like portion is formed with a surface 106 perpendicular to the X-direction. As described later, the surface 106 functions as a projecting range defining portion 106 which defines a projecting range of the operative member 200 from the base member 100 in the X-direction.

The other side portion of the base member 100, which is opposed to the projecting range defining portion 106, is formed with a pivot hole 108. The pivot axle 700 is inserted into the pivot hole 108. This side portion is further formed with a retaining portion 112 and a channel 116. The retaining portion 112 and the channel 116 are located so that the pivot hole 108 is positioned therebetween in the X-direction. In other words, the retaining portion 112 and the channel 116 are located at opposite sides, respectively, with respect to the pivot hole 108. The retaining portion 112 has an inner wall 114. The channel 116 is formed with a surface (receiver portion) 118. The surface 118 defines a dead end of the channel 116. As described later, according to the present embodiment, the inner wall 114 of the retaining portion 112 and the receiver portion 118 of the channel 116 define a limit position of an anti-clockwise rotational movement of the locking member 600.

The base member 100 is further formed with a support portion 120 behind the channel 116 (at a position nearer to the rear end of the base member 100). The support portion 120 is shaped like a boss projecting in the Z-direction. The support portion 120 is inserted into a body portion of the helical torsion coil spring 800 so as to support the helical torsion coil spring 800 (see FIGS. 5 and 7). The helical torsion coil spring 800 has opposite ends 802 and 804. As can be seen from FIGS. 5, 7 and 10, the base member 100 is formed with a spring holding portion 122 in the vicinity of the support portion 120. The spring holding portion 122 holds the end 802 of the helical torsion coil spring 800.

Figure 5:
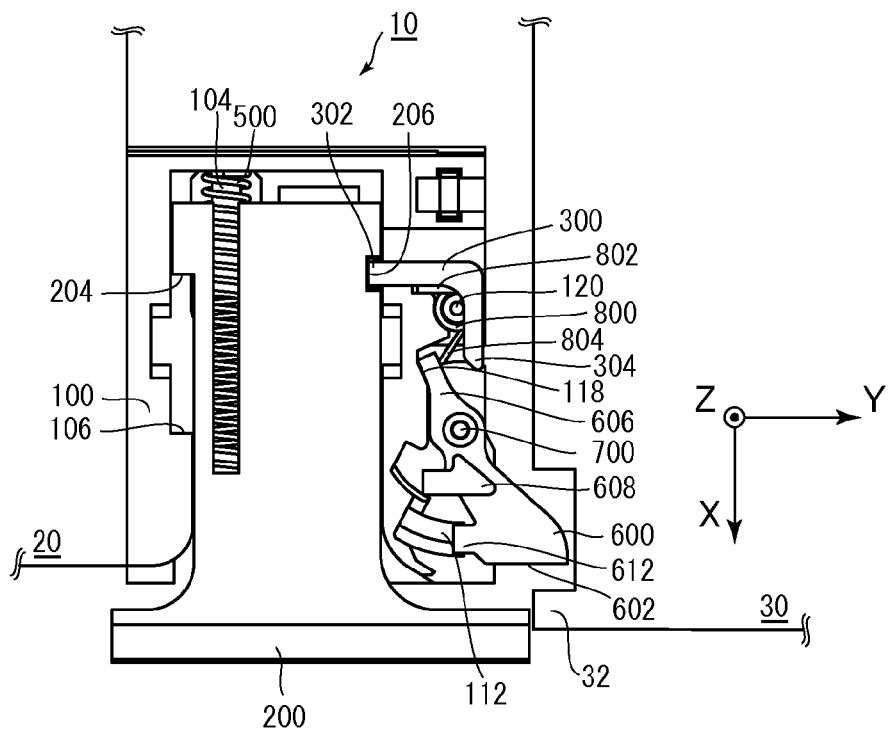
FIG. 5 is a top view showing the latching module of FIG. 4, wherein an operative member of the latching module is in a retained state.
Figure 7:
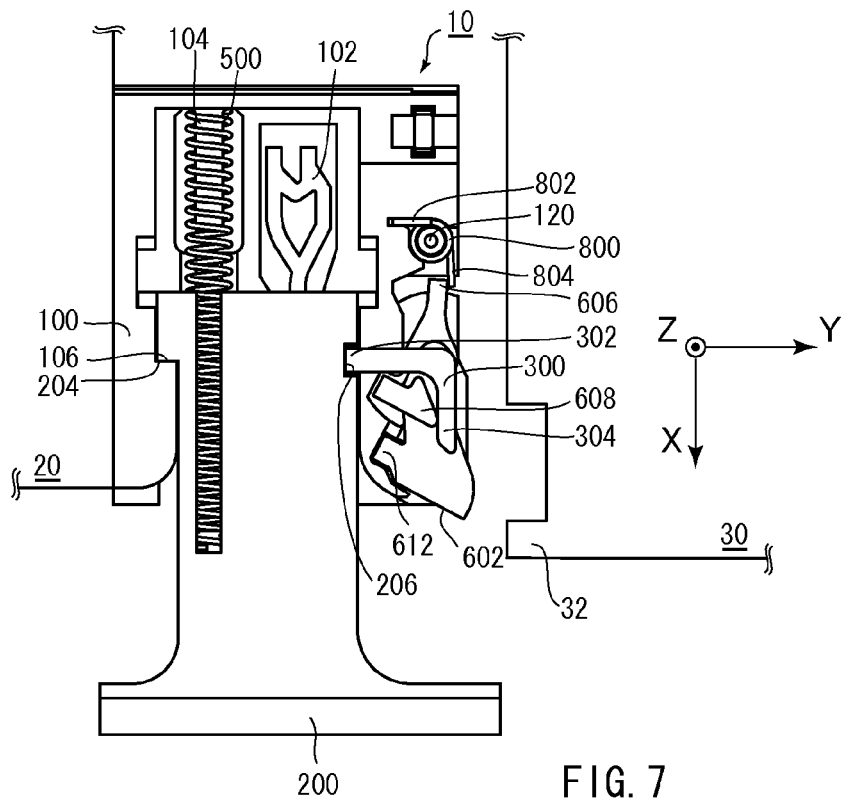
FIG. 7 is a top view showing the latching module of FIG. 4, wherein the operative member is in a projecting state.
Figure 8:
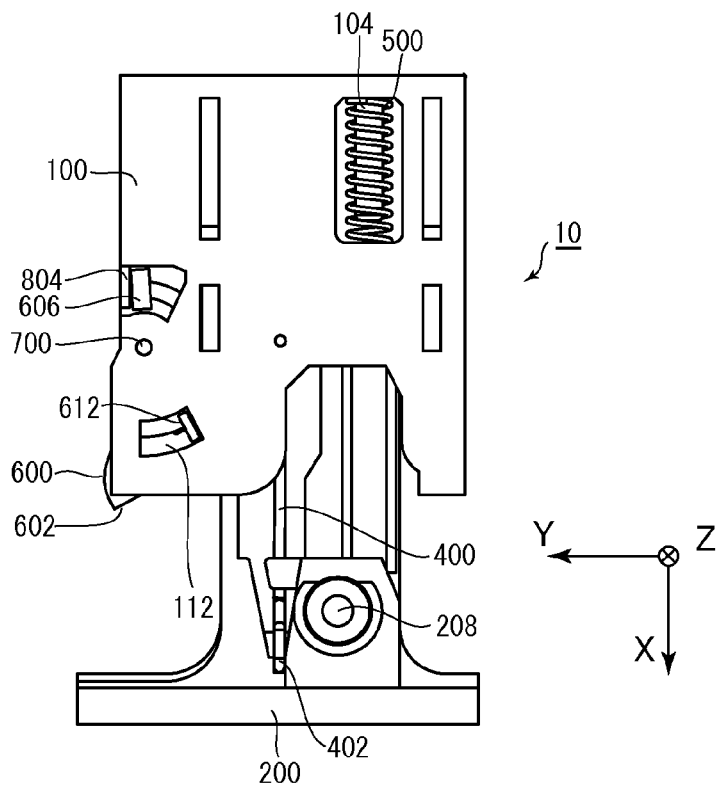
FIG. 8 is a bottom view showing the latching module of FIG. 7.

Referring to FIGS. 5, 7 and 8, the operative member 200 is pressed toward the X-direction (i.e. a direction in which the operative member 200 projects out from the base member 100) by the spring 500. Thus, the spring 500 functions as a projection urge member 500 which urges the operative member 200 to project outwardly from the base member 100 in the X-direction.

Figure 11:
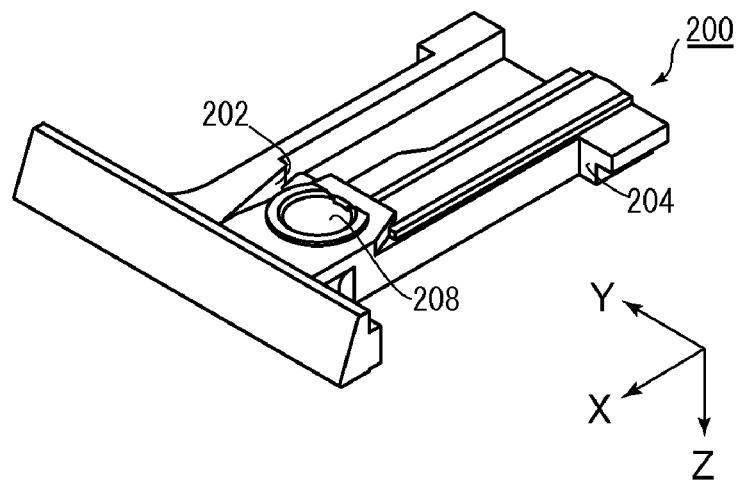
FIG. 11 is a perspective view showing the operative member of the latching module of FIG. 4 as seen from a bottom side of the operative member.

Referring to FIG. 11, the operative member 200 is provided with a shaft holding portion 202 on a bottom side. The shaft holding portion 202 holds the end 402 of the guide shaft 400 so that the guide shaft 400 is turnable within a predetermined range. As described above, the end 404 of the guide shaft 400 is engaged with the cam groove 102 in such a manner that the end 404 is movable in the cam groove 102. Therefore, when the operative member 200 is pressed toward the negative X-direction against a pressing force of the spring 500, the end 404 of the guide shaft 400 follows on the cam surface which is formed on the cam groove 102. According to the present embodiment, the push-push mechanism is configured as described above.

Figure 6:
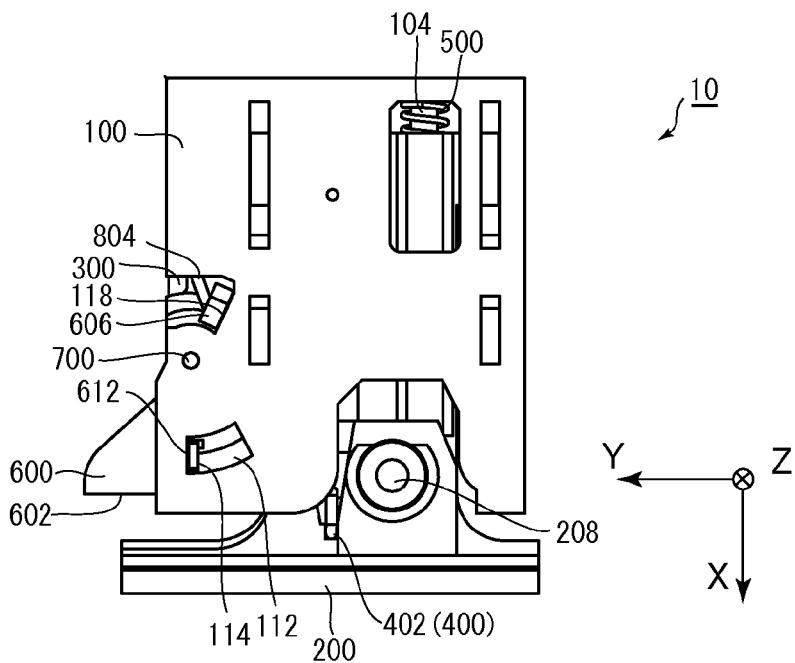
FIG. 6 is a bottom view showing the latching module of FIG. 5.

Referring to FIG. 11, the operative member 200 is formed with a laterally projecting part in the vicinity of a rear end. This projecting part has a surface 204 on a front end thereof. Referring to FIGS. 5 and 7, the surface 204 functions as a contact portion 204 which is brought into contact with the projecting range defining portion 106 of the base member 100 when the operative member 200 is moved toward the positive X-direction. As can be seen from above description, the operative member 200 according to the present embodiment can be in either of two states. One of the two states is a projecting state where the contact portion 204 is brought into contact with the projecting range defining portion 106 in the X-direction (predetermined direction) as shown in FIGS. 7 and 8. The other one of the two states is a retained state where the operative member 200 is mostly retained in the base member 100 as shown in FIGS. 5 and 6. When the operative member 200 is in the retained state, the operative member 200 receives an elastic force directed to the positive X-direction from the spring 500. However, the guide shaft 400 resists the elastic force together with the cam groove 102 so that the retained state is maintained. The operative member 200 is configured to be able to transit only between the aforementioned two states. In other words, the operative member 200 according to the present embodiment is in a transitional state only when the operative member 200 transits between the projecting state and the retained state. Usually, the operative member 200 is in the retained state when the electronic apparatus 30 is in use. The aforementioned push-push mechanism is used so as to detach the unit 20 from the electronic apparatus 30. In detail, the operative member 200 is slightly pushed into the electronic apparatus 30 so that the elastic force of the spring 500 forces the operative member 200 to transit into the projecting state. Thus, the operative member 200 is forced to project out from the unit 20. The unit 20 can be pulled out of the electronic apparatus 30 by pulling the projecting operative member 200.

Figure 12:
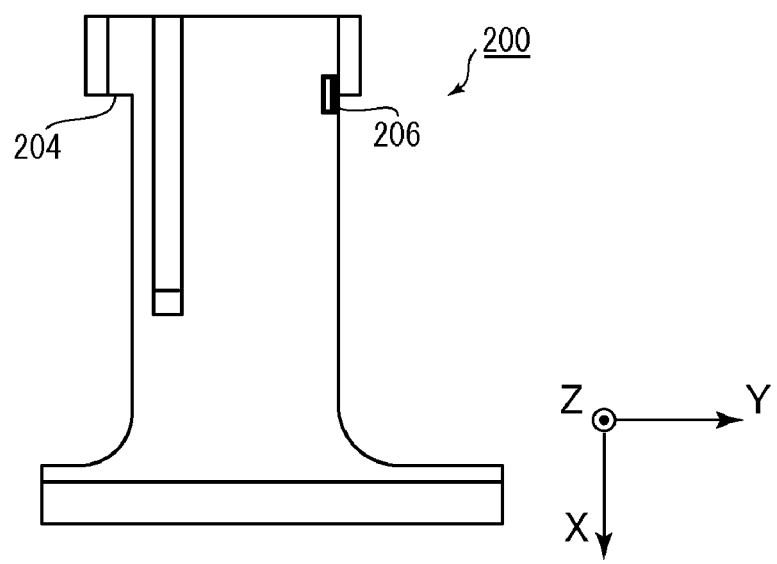
FIG. 12 is a top view showing the operative member of FIG. 11.
Figure 13:
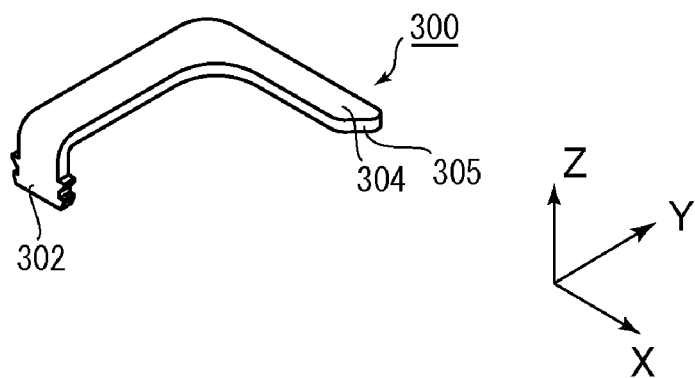
FIG. 13 is a perspective view showing a pressing member which is configured to be attached to the operative member of FIG. 11.

Referring to FIGS. 5, 7 and 12, the operative member 200 is formed with a press fit hole 206 on an upper surface. The press fit hole 206 is formed in vicinity of the rear end of the operative member 200. As shown in FIG. 13, the pressing member 300 has an L-like shape with opposite ends. One of the two ends of the pressing member 300 serves as a press fit portion 302, and the other end serves as a pressing portion 304. The press fit portion 302 is press-fitted into the press fit hole 206 (see FIGS. 5 and 7). As can be seen from FIG. 13, the pressing portion 304 according to the present embodiment is formed with a tip surface 305 which is perpendicular both to the X-direction and the Y-direction.

Referring to FIGS. 6 and 11, the operative member 200 is formed with a screw hole 208 on a bottom surface so as to screw and fix the operative member 200 on the electronic apparatus 30. As described above, the operative member 200 is supported by the base member 100 so as to be movable relative to the base member 100 in the X-direction. However, it is preferable to fix the operative member 200 to the electronic apparatus 30 in some cases. For example, while the electronic apparatus 30 is transported, it is preferable to forcibly regulate the operative member 200 not to move relative to the base member 100 so as to lock the retained state of the operative member 200. As for another unit 20 which is rarely attached to or removed from an electronic apparatus 30, it is preferable to prevent the operative member 200 to project accidentally when the unit 20 is attached to the electronic apparatus 30. In such cases, for example, the chassis (not shown) of the electronic apparatus 30 may be formed with a hole corresponding to the screw hole 208. The screw hole 208 of the operative member 200 and the hole of the electronic apparatus 30 are threaded with a screw so that the operative member 200 is fixed to the electronic apparatus 30.

Figure 15:
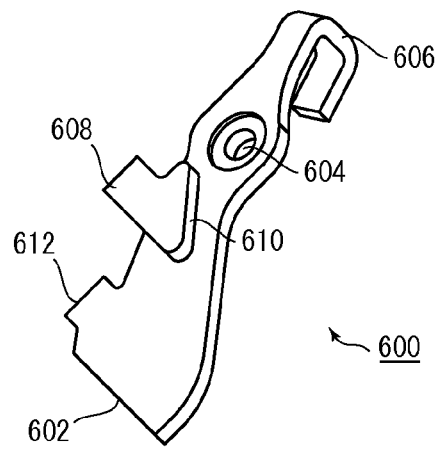
FIG. 15 is a perspective view showing a locking member of the latching module of FIG. 4.
Figure 16:
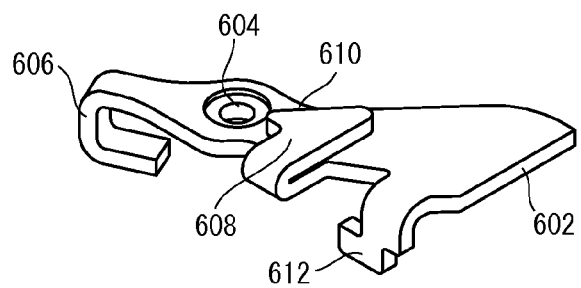
FIG. 16 is a perspective view showing the locking member of FIG. 15 as seen from another direction.
Figure 17:
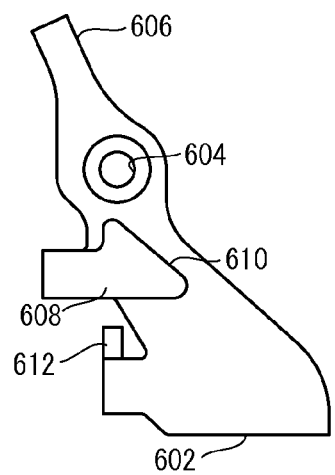
FIG. 17 is a top view showing the locking member of FIG. 15.

Referring to FIGS. 15 to 17, the locking member 600 according to the present embodiment includes an engagement portion 602, a pivot portion 604, an urged portion 606, a pressed portion 608 and a rotation regulator 612. The engagement portion 602 is configured to be engaged with the engaged portion 32 of the electronic apparatus 30. The pivot portion 604 is located between the rotation regulator 612 and the urged portion 606. The pivot portion 604 is configured so that the pivot axle 700 is inserted into the pivot portion 604. The urged portion 606 is located opposite to the engagement portion 602 across the pivot portion 604. In other words, the pivot portion 604 is positioned between the urged portion 606 and the engagement portion 602. The pressed portion 608 is formed on the locking member 600 so as to be located between the pivot portion 604 and the engagement portion 602. The illustrated locking member 600 is produced by punching and bending a common sheet metal. However, the locking member 600 according to the present invention is not limited to the illustrated example. For example, if the locking member 600 complies with requirements about strength, the locking member 600 may be made of a nonmetallic material like a resin and so on.

As can be seen from FIGS. 5 and 17, when the pivot axle 700 is inserted into the pivot portion 604, the locking member 600 is supported by the base member 100 so that the locking member 600 is pivotable on the pivot portion 604 from an engaged position to a released position relative to the base member 100. In the illustrated structure according to the present embodiment, the pivot axle 700 is fixed to the base member 100, and the locking member 600 is pivotally supported by this fixed pivot axle 700. However, for example, the pivot axle 700 may be fixed to the locking member 600 and inserted through the pivot hole 108 so that the pivot axle 700 is rotatable in the pivot hole 108.

The engaged position of the locking member 600 is a position where the engagement portion 602 is able to be engaged with the engaged portion 32. Specifically, the engaged position is a position as shown in FIGS. 5 and 6. As can be seen from the illustrated locking member 600, when the locking member 600 is located at the engaged position, the engagement portion 602 according to the present embodiment extends perpendicular to the X-direction and projects out long in the Y-direction from the base member 100.

On the other hand, the released position of the locking member 600 is a position where the engagement portion 602 is unable to be engaged with the engaged portion 32. Specifically, the engaged position is a position as shown in FIGS. 7 and 8. As can be seen from the illustrated locking member 600, when the locking member 600 is located at the released position, most of the engagement portion 602 is located on the base member 100, and a considerably small part of the locking member 600 projects out from the base member 100. Therefore, the engagement portion 602 is not engaged with the engaged portion 32 when the latching module 10 is moved to the X-direction so that it is possible to pull out the unit 20 from the electronic apparatus 30 along with the latching module 10.

As can be seen from FIGS. 5, 7, 9, 15 and 16, the urged portion 606 has a roughly U-like shaped cross-section. The urged portion 606 is arranged so that the curved bottom part of the U-shape is located in the channel 116. The urged portion 606 is constantly urged by the end 804 of the helical torsion coil spring 800 toward the receiver portion 118 formed on a back side of the channel 116. Therefore, the locking member 600 is configured to be located at the engaged position when any other forces than an elastic force from the helical torsion coil spring 800 are not applied to the locking member 600. Thus, the helical torsion coil spring 800 functions as the lock urge member 800 which is configured to push the urged portion 606 so that the locking member 600 is urged toward the engaged position. According to the present embodiment, the lock urge member 800 is formed as a different member than the locking member 600 so that a size or a material of the lock urge member 800 can be designed or selected with lesser restriction. In other words, it is possible to attempt to reduce a size of the latching module 10 in various ways.

According to the present embodiment, the urged portion 606 and the engagement portion 602 are located on opposite sides of the locking member 600 with respect to the pivot portion 604. The elastic force of the helical torsion coil spring 800 is applied to the urged portion 606 so that the locking member 600 is forced to be located at the engaged position. A distance from the pivot portion 604 to the engagement portion 602 is designed to be longer than another distance from the pivot portion 604 to the urged portion 606 so that the engagement portion 602 of the locking member 600 projects out large when the locking member 600 is located at the engaged position. In other words, a small movement of the urged portion 606 can force the engagement portion 602 to project out large.

As shown in FIGS. 16 and 17, the pressed portion 608 is formed in such a manner that a part of the locking member 600 is folded along an axis perpendicular to a direction in which the engagement portion 602 extends. The pressed portion 608 is formed with a pressed surface 610 at a side facing the pivot portion 604. The pressed surface 610 is configured to be pressed against the pressing portion 304 of the pressing member 300. The pressed surface 610 according to the present embodiment is a surface (end surface) which extends in a plane oblique both to the X-direction and the Y-direction when the locking member 600 is located at the engaged position. When the pressed surface 610 is pressed against the pressing portion 304 toward the X-direction, the locking member 600 receives a torque around the pivot portion 604 so that the locking member 600 pivots from the engaged position shown in FIG. 5 toward the released position shown in FIG. 7. According to the present embodiment, the pressed surface 610 of the pressed portion 608 and the tip surface 305 of the pressing portion 304 extend short in a height direction (Z-direction) of the latching module 10 and extend long in a direction perpendicular to the height direction when the locking member 600 and the pressing member 300 are incorporated into the latching module 10. The pressed surface 610 and the tip surface 305 are configured to be brought into abutment with each other when the pressed portion 608 is brought into contact with the pressing portion 304. Therefore, it is possible not only to ensure strengths of the pressed portion 608 and the pressing portion 304 but also to prevent the latching module 10 from increasing in size in the height direction (Z-direction).

As can be seen from aforementioned structure of the latching module 10, according to the present embodiment, the locking member 600 is configured to be located at the engaged position when the operative member 200 is in the retained state, and the locking member 600 is configured to be located at the released position when the operative member 200 is in the projecting state. The pressing portion 304 of the pressing member 300 and the pressed portion 608 of the locking member 600 form a release mechanism. While the operative member 200 transits from the retained state into the projecting state, the release mechanism serves to move the locking member 600 to the released position. In detail, the release mechanism is designed to force the locking member 600 to pivot on the pivot portion 604 to the released position upon the projection of the operative member 200. In other words, the pressing portion 304 of the pressing member 300 is configured to press the pressed portion 608 upon the projection of the operative member 200 so as to force the locking member 600 to pivot toward the released position. When the operative member 200 is in the retained state, the locking member 600 can be engaged with the electronic apparatus 30 so that the unit 20 is unable to be pulled out of the electronic apparatus 30. When the operative member 200 is in the projecting state, the locking member 600 is located at the released position while the engagement of the locking member 600 with the electronic apparatus 30 is released so that the unit 20 can be pulled out of the electronic apparatus 30 by pulling the operative member 200.

When the locking member 600 is located at the engaged position, an impact may be applied to the electronic apparatus 30 so that a force directed to the negative X-direction may be applied to the engagement portion 602. In such a case, the locking member 600 receives an undesirable force which forces the locking member 600 to pivot beyond the engaged position. If the locking member 600 is destroyed by this undesirable force, the latching module 10 is not able to work effectively. Therefore, it is preferable to configure the locking member 600 so as to withstand the aforementioned undesirable force. As sown in FIG. 16, according to the present embodiment, the locking member 600 is provided with the rotation regulator 612 so as to withstand the undesirable force. The rotation regulator 612 is formed at a side part of the engagement portion 602. The rotation regulator 612 is configured to be retained in the retaining portion 112 of the base member 100. The rotation regulator 612 does not regulate a movement of the locking member 600 while the locking member 600 pivots between the engaged position and the released position. On the other hand, when the locking member 600 pivots to the engaged position (i.e. upon a large pivot movement of the locking member 600), the rotation regulator 612 is brought into abutment with the inner wall 114 of the retaining portion 112 so that the locking member 600 is prevented from rotating improperly beyond the engaged position. Furthermore, according to the present embodiment, the urged portion 606 which is opposed to the rotation regulator 612 across the pivot portion 604 is similarly configured to be received by the receiver portion 118 of the base member 100 when the rotation regulator 612 is brought into abutment with the inner wall 114. Therefore, the undesirable rotational movement of the locking member 600 is also prevented by the receiver portion 118 which is configured to receive the urged portion 606. Moreover, the pivot portion 604 and the pivot axle 700, together with the engagement portion 602, are arranged to receive a force which is applied to the engagement portion 602 when the locking member 600 is located at the engaged position. In detail, according to the present embodiment, the force applied to the engagement portion 602 when the locking member 600 is located at the engaged position is distributed into three forces. The latching module 10 is formed with three force receivers which receive the three distributed forces, respectively. The first force receiver of the three force receivers is formed from the rotation regulator 612 and the inner wall 114 of the retaining portion 112. The second force receiver is formed from the urged portion 606 and the receiver portion 118. The third force receiver is formed from the pivot portion 604 and the pivot axle 700. Therefore, it is possible to avoid damages of the locking member 600 even when a relatively strong force is applied to the locking member 600.

Figure 3:
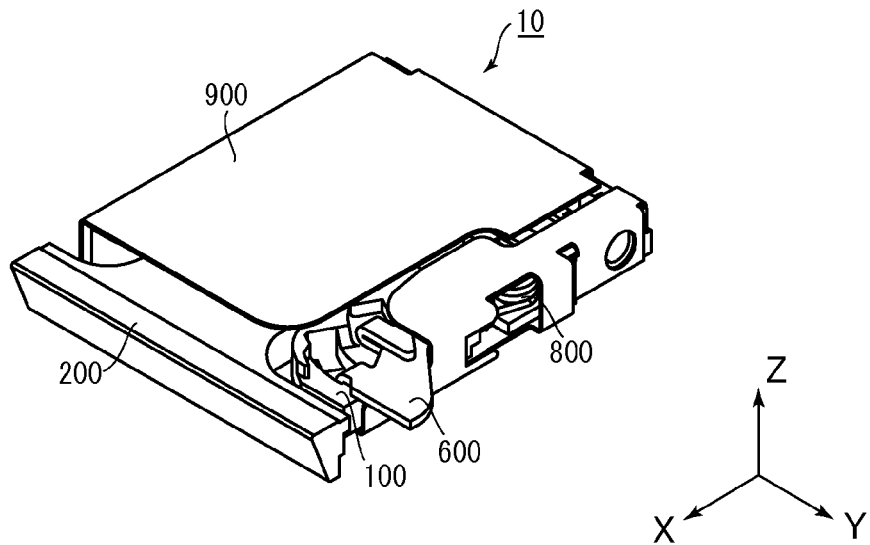
FIG. 3 is a perspective view showing the latching module of FIG. 1.
Figure 4:
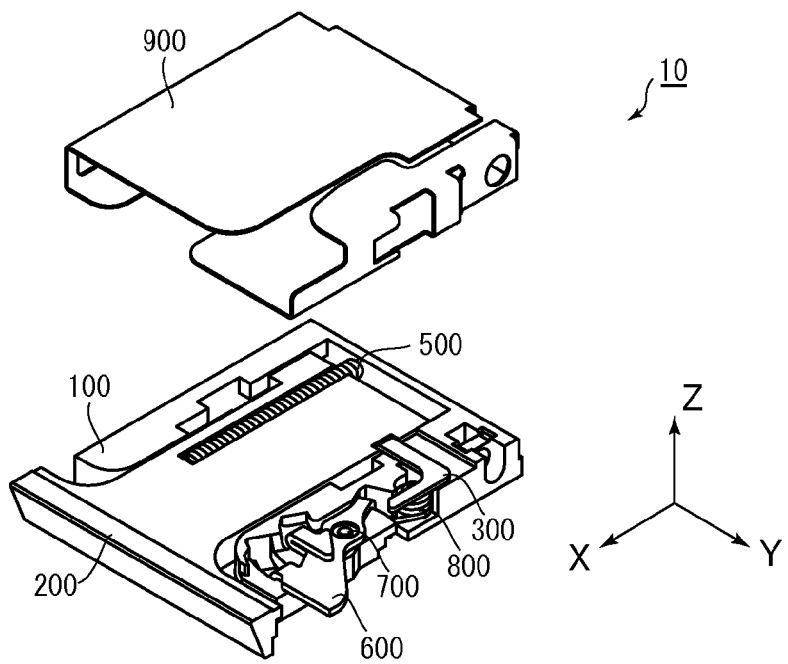
FIG. 4 is a partially-exploded, perspective view showing a shell and a collectivity of other components of the latching module of FIG. 3.

A projecting range of the engagement portion 602 from the latching module 10 is an important factor in a latching mechanism in which the engagement portion 602 of the locking member 600 is engaged with the engaged portion 32 of the electronic apparatus 30 as described above. It is preferable to locate the pressing portion 304 of the pressing member 300 as far as possible from the operative member 200 so as to enlarge a moving range of the engagement portion 602. On the other hand, the pressing member 300 is required to be located within the shell 900, at least when the operative member 200 is in the retained state. Therefore, to use an inner space of the latching module 10 effectively, the pressing portion 304 should move along an edge line within the shell 900. The edge line of the shell 900 is close to outside of the shell 900 in the Y-direction and extends in parallel to the X-direction. In other words, the pressing portion 304 should be configured to move in the vicinity of an inside surface of the shell 900 in the Y-direction. It is preferable that the pressed portion 608 of the locking member 600 is located at a position where is nearer to outside of the shell 900 in the Y-direction than the pressing portion 304 so as to ensure the pressed portion 608 to be pressed against the pressing portion 304 and to pivot in a wide range (for example, see FIG. 5). Considering the position of the pressing portion 304, it is preferable, as shown in FIG. 3. that the pressed portion 608 is, at least in part, located at outside of the shell 900 so as to avoid the shell 900 to have a complicated structure. According to the present embodiment, the pressing member 300 is located in the shell 900 when the locking member 600 is located at the engaged position, and the pressed portion 608 protrudes, at least in part, out of the shell 900 when the locking member 600 is located at the engaged position.

When the latching module 10 configured as described above is attached to the unit 20, it is possible to fix the shell 900 to a chassis of the unit 20 and thereafter insert an assembly of the other components into the shell 900 and fix the assembly to the shell 900 by screwing and so on. It is also possible to wholly assemble the latching module 10 and thereafter attach the assembly to the chassis of the unit 20.

Second Embodiment

Figure 18:
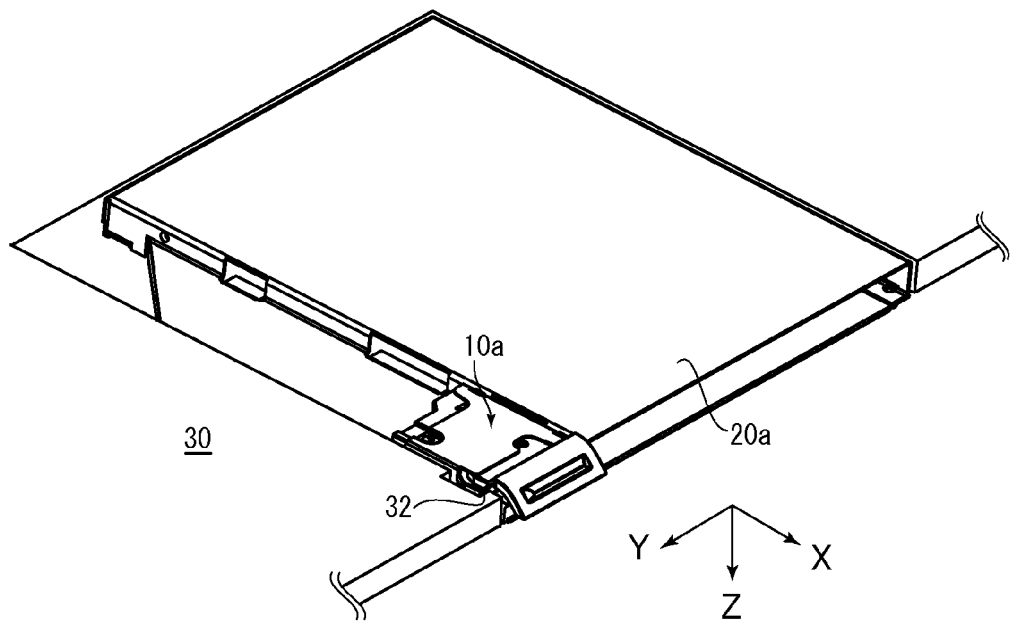
FIG. 18 is a perspective view showing the positional relation between the electronic apparatus and the unit which is provided with the latching module according to a second embodiment of the present invention.
Figure 19:
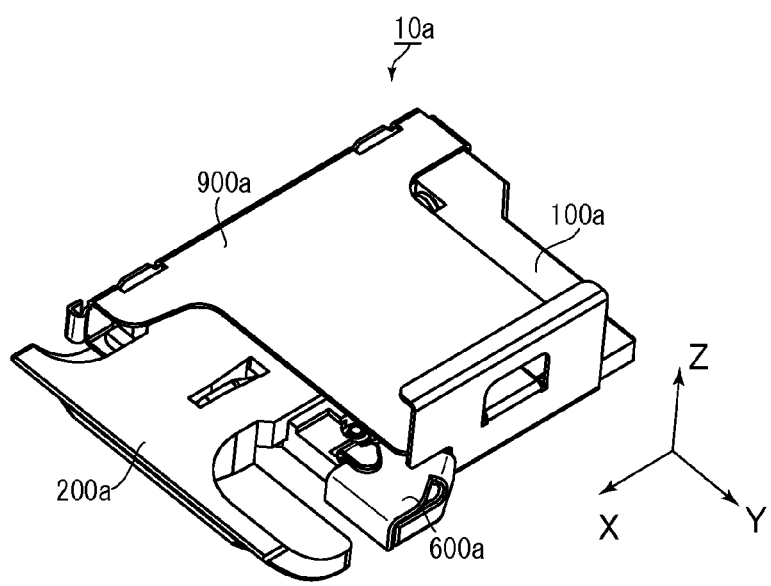
FIG. 19 is a perspective view showing the latching module of FIG. 18.

Referring to FIGS. 18 and 19, a latching module 10a according to a second embodiment of the present invention is configured to be attached and fixed to a unit 20a similarly to the latching module 10 according to the first embodiment as described above (see FIGS. 1 and 2). The unit 20a is designed to be detachably installed in an electronic apparatus 30 along the X-direction (predetermined direction).

Referring to FIGS. 19 to 23, the latching module 10a according to the present embodiment includes a base member 100a, an operative member 200a, a pressing member 300a, a guide shaft 400a, a spring (projection urge member) 500a, a locking member 600a, a pivot axle 700a, a helical torsion coil spring (lock urge member) 800a and a shell 900a made of a metal. The base member 100a is configured to be fixed to the unit 20a. The operative member 200a is supported by the base member 100a. The pressing member 300a is attached to the operative member 200a. The spring 500a is supported by the base member 100a. The locking member 600a is retained by the base member 100a. The pivot axle 700a is formed on the base member 100a (see FIG. 24). The shell 900a covers, at least in part, the base member 100a and covers most of the other members of the latching module 10a. The base member 100a is fixed to the unit 20a. The latching module 10a is different from the latching module 10 especially in structures of the locking member 600a and the base member 100a to which the locking member 600a is attached. In the following description, it may not be described repeatedly about same structures as the latching module 10.

Figure 22:
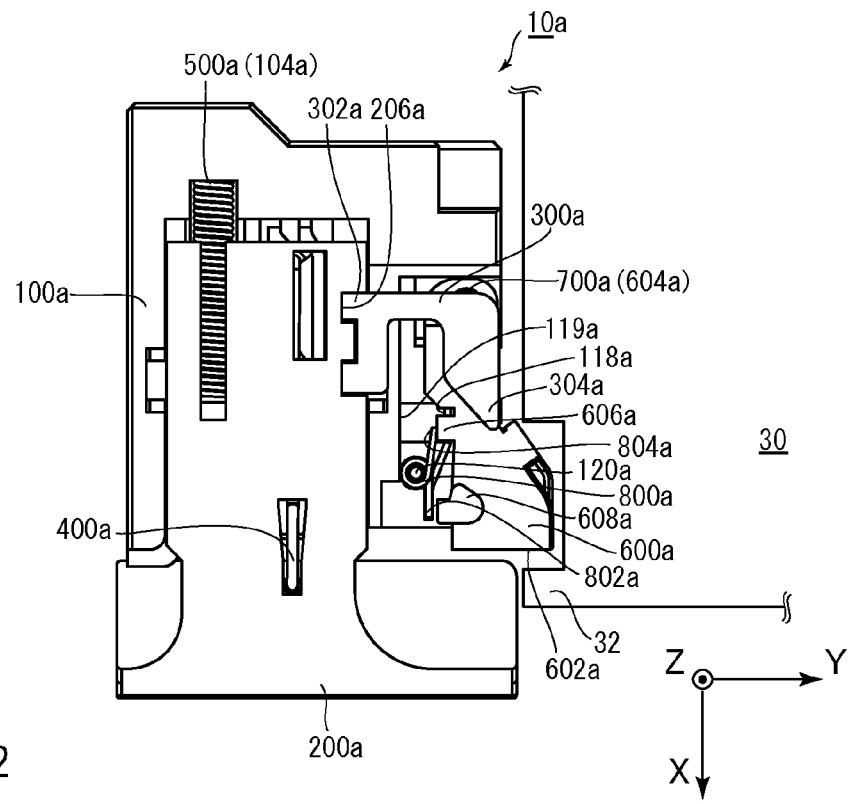
FIG. 22 is a top view showing the latching module of FIG. 20, wherein the operative member of the latching module is in the retained state.
Figure 23:
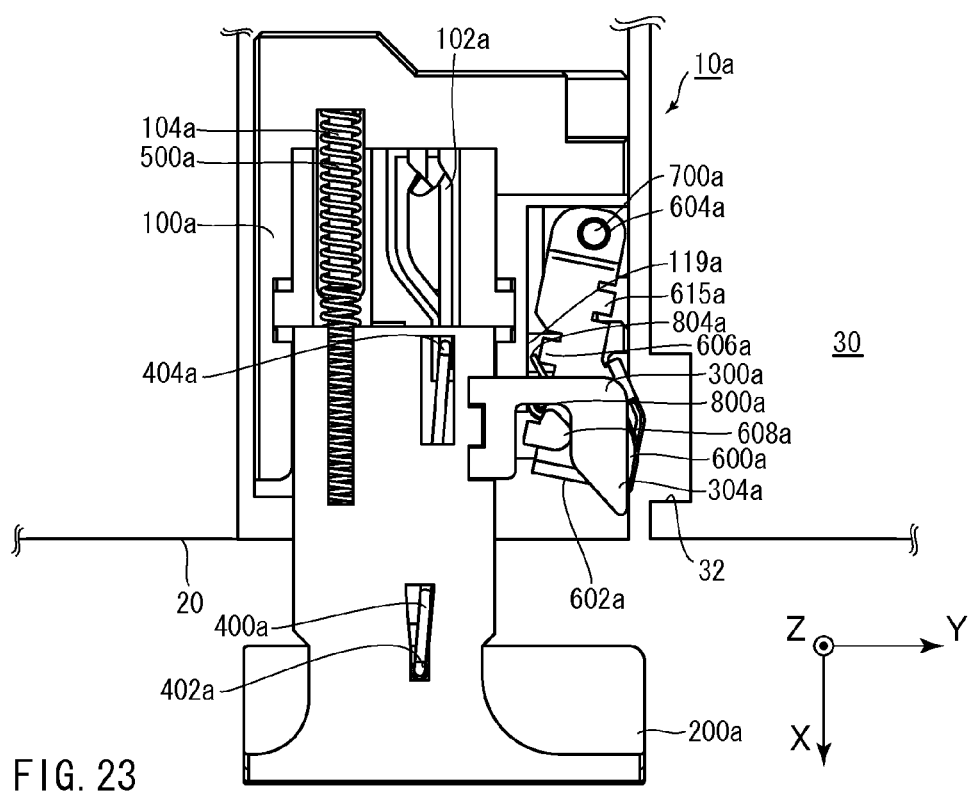
FIG. 23 is a top view showing the latching module of FIG. 20, wherein the operative member is in the projecting state.
Figure 24:
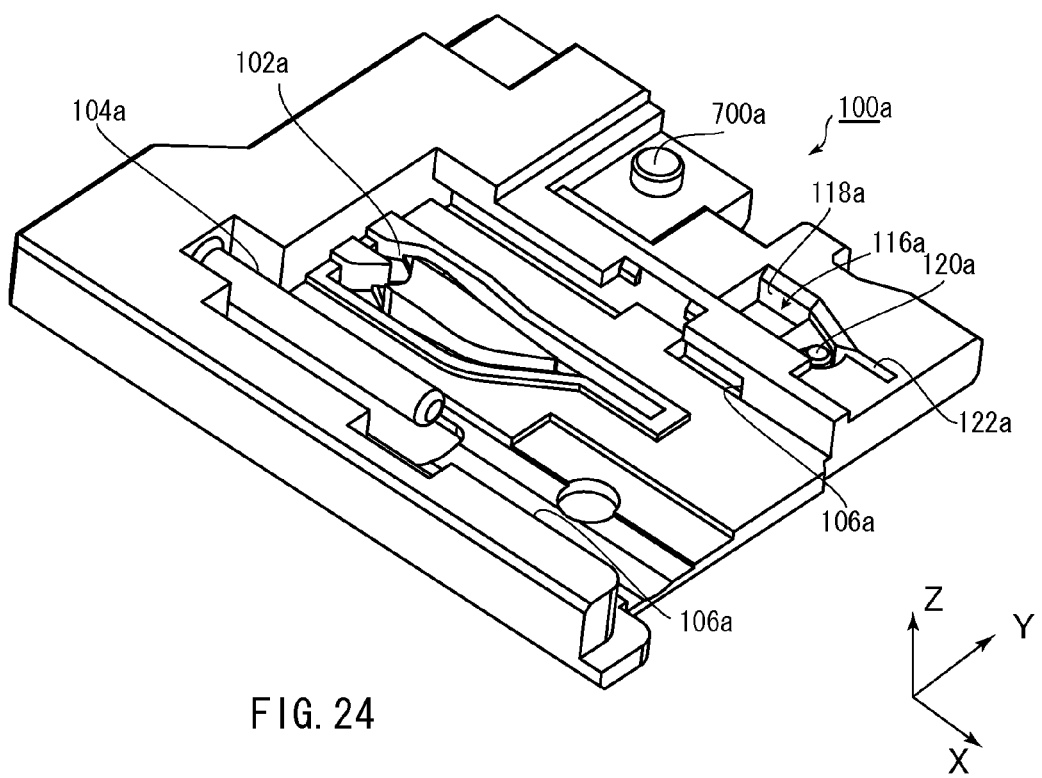
FIG. 24 is a perspective view showing the base member of the latching module of FIG. 20.
Figure 25:
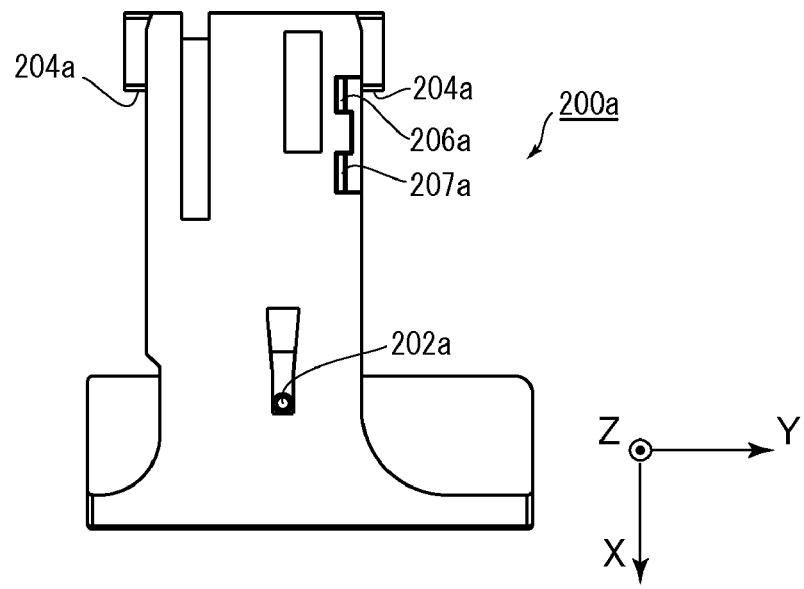
FIG. 25 is a top view showing the operative member of the latching module of FIG. 20.

Referring to FIG. 24, the base member 100a according to the present embodiment is formed with a cam groove 102a, a support pole 104a and a projecting range defining portion 106a, similarly to the base member 100. Each of the parts of the base member 100a described above has the same function as the corresponding part of the base member 100. For example, the illustrated cam groove 102a is designed to form a "heart cam". As partially shown in FIGS. 20 and 23, the guide shaft 400a has opposite ends 402a and 404a. The cam groove 102a is configured to be engaged with the end 404a of the guide shaft 400a so that the cam groove 102a forms the so-called "push-push mechanism" together with the guide shaft 400a and the operative member 200a. As shown in FIGS. 20 to 23, the support pole 104a is configured to support the spring 500a. The spring 500a functions as a projection urge member 500a which urges the operative member 200a to project outwardly from the base member 100a in the X-direction. As shown in FIG. 24, the projecting range defining portion 106a according to the present embodiment is shaped as a recess depressed in the Y-direction. As shown in FIG. 25, the operative member 200a is formed with a contact portion 204a. The contact portion 204a is shaped as a protrusion protruding in the Y-direction. The base member 100a and the operative member 200a have structures described above so that the contact portion 204a is brought into contact with a front surface of the projecting range defining portion 106a when the operative member 200a which is attached to the base member 100a is pulled out along the X-direction. Thus, the projecting range defining portion 106a defines a projecting range of the operative member 200a from the base member 100a in the X-direction. As can be seen from above description, the operative member 200a can be in either of the projecting state (see FIG. 23) or the retained state (see FIGS. 20 and 22). The operative member 200a is configured to be able to transit only between the aforementioned two states. According to the present embodiment, similarly to the first embodiment, the aforementioned push-push mechanism is used when the unit 20a is detached from the electronic apparatus 30. In detail, the operative member 200a is slightly pushed into the electronic apparatus 30 so that a elastic force of the spring 500a forces the operative member 200a to project. The unit 20a can be pulled out of the electronic apparatus 30 by pulling the operative member 200a which projects out from the unit 20.

Figure 20:
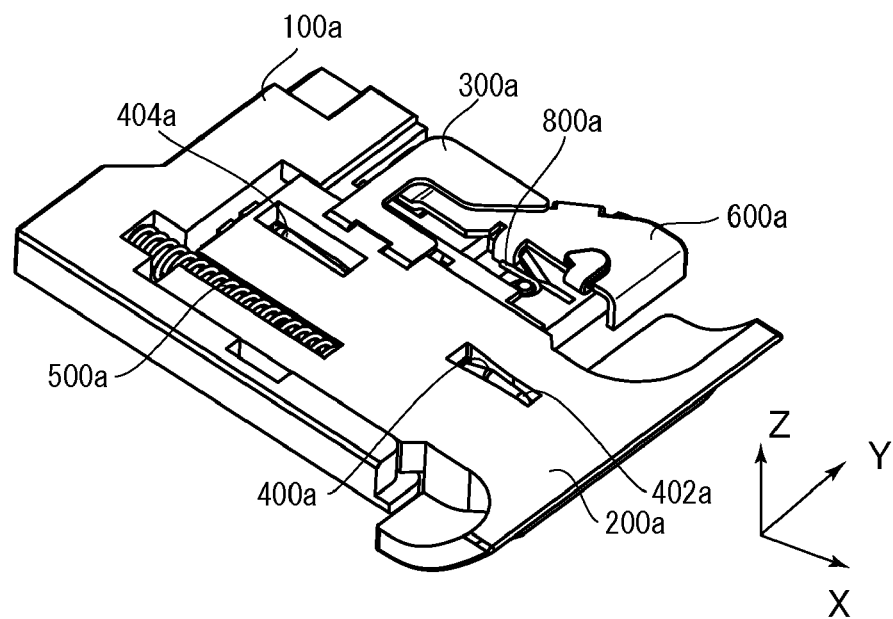
FIG. 20 is a perspective view showing the latching module of FIG. 19 as seen from another direction, wherein the shell is not illustrated.
Figure 21:
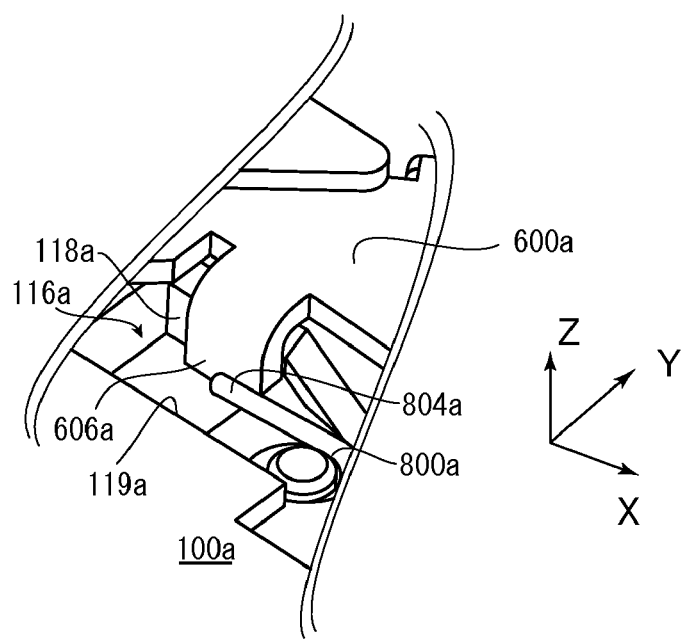
FIG. 21 is a partial, enlarged perspective view showing around a retaining portion of the latching module of FIG. 20.

Referring to FIG. 24, the base member 100a according to the present embodiment is formed with a pivot axle 700a, a retaining portion 116a, a support portion 120a and a spring holding portion 122a. The pivot axle 700a protrudes from the base member 100a in the Z-direction. The retaining portion 116a is located in front of the pivot axle 700a. The retaining portion 116a has a recess-like shape so as to be formed with a side wall. The support portion 120a and the spring holding portion 122a are located in front of the retaining portion 116a. The locking member 600a is formed with a pivot portion 604a and an urged portion 606a (see FIGS. 27 to 29). The pivot axle 700a is configured to be inserted through the pivot portion 604a as described later in detail (see FIG. 23). The urged portion 606a is configured to be retained in the retaining portion 116a. Referring to FIGS. 20 and 21, the retaining portion 116a according to the present embodiment is shaped as a roughly rectangular recess so that a metal die of the base member 100a can be produced easily in a manufacturing process. However, in a case where the base member 100a is intended to be minimized by optimizing an inner layout of the base member 100a, the retaining portion 116a may be shaped in a shape, such as a fan-shape, which has the minimum necessary size for the urged portion 606a to move, similarly to the retaining portion 112 (see FIG. 5) of the first embodiment. As shown in FIG. 22, the support portion 120a is configured to support the helical torsion coil spring 800a. The helical torsion coil spring 800a has opposite ends 802a and 804a. The end 802a of the helical torsion coil spring 800a is retained in the spring holding portion 122a.

Figure 26:
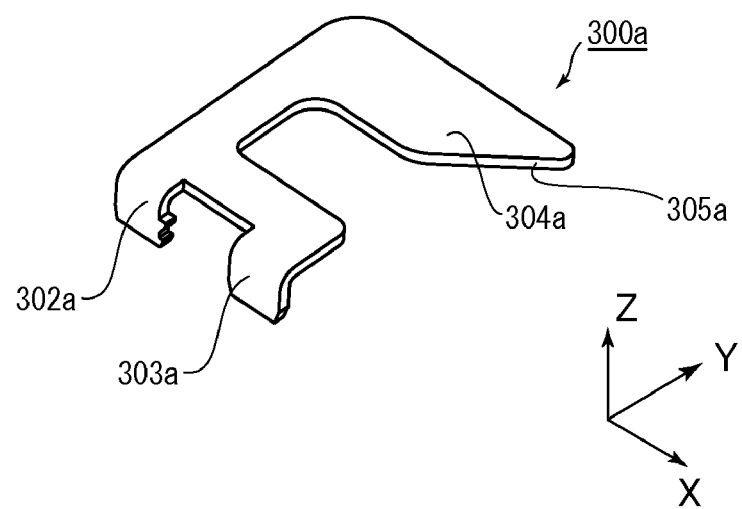
FIG. 26 is a perspective view showing the pressing member which is configured to be attached to the operative member of FIG. 25.

Referring to FIGS. 20 and 25, the operative member 200a is held by the base member 100a together with the pressing member 300a attached to the operative member 200a. The operative member 200a according to the present embodiment is formed with a press fit hole 206a and a recess 207a. As shown in FIG. 26, the pressing member 300a has a press fit portion 302a, an inserted portion 303a and a pressing portion 304a. The press fit portion 302a and the inserted portion 303a are inserted into the press fit hole 206a and the recess 207a, respectively. The pressing member 300a is fixed to the operative member 200a by both of the press fit portion 302a and the inserted portion 303a so that the pressing member 300a is fixed more securely than the pressing member 300 of the first embodiment. Therefore, it is possible to prevent the pressing member 300a to be deformed more certainly.

As shown in FIG. 26, the pressing portion 304a formed on the pressing member 300a according to the present embodiment has a tip surface 305a. The tip surface 305a extends in a direction perpendicular to the X-direction and the Y-direction similarly to the tip surface 305.

Referring to FIGS. 27 to 29, the locking member 600a according to the present embodiment includes an engagement portion 602a, a pressed portion 608a, a bent portion 613a and a U-shaped portion 615a in addition to the pivot portion 604a and the urged portion 606a. The engagement portion 602a is configured to be engaged with the engaged portion 32 of the electronic apparatus 30 (see FIG. 18). The pivot portion 604a is configured so that the aforementioned pivot axle 700 is inserted into the pivot portion 604a. The urged portion 606a is positioned between the engagement portion 602a and the pivot portion 604a. The pressed portion 608a is located between the engagement portion 602a and the urged portion 606a. The locking member 600a according to the present embodiment is produced by punching and bending a common sheet metal. However, if the locking member 600a complies with requirements about strength, the locking member 600a may be made of a nonmetallic material like a resin and so on.

As can be seen from FIGS. 22, 23 and 29, the locking member 600a is held by the base member 100a so that the locking member 600a is placed in a state where the pivot axle 700 is inserted into the pivot portion 604a. The locking member 600a is pivotable relative to the base member 100a between the engaged position (see FIG. 22) and the released position (see FIG. 23). In the present embodiment, the pivot axle 700a may be formed on the locking member 600a. In such a case, the base member 100a may be formed with a hole into which the pivot axle 700a is inserted.

Referring to FIG. 22, when the locking member 600a is located at the engaged position, the engagement portion 602a extends perpendicular to the X-direction and projects out long in the Y-direction from the base member 100a. When the locking member 600a is located at the engaged position, the engagement portion 602a is arranged to be engaged with the engaged portion 32 so that the latching module 10a and the unit 20a can not be pulled out. Referring to FIG. 23, on the other hand, when the locking member 600a is located at the released position, the engagement portion 602a mostly located on the base member 100a, and a considerably small part of the locking member 600a projects out from the base member 100a. Therefore, the engagement portion 602a is not engaged with the engaged portion 32 when the latching module 10a is moved to the X-direction so that the unit 20a can be pulled out from the electronic apparatus 30 along with the latching module 10a. The engagement portion 602a according to the present embodiment is formed by bending an end portion of the locking member 600a downwardly so that the engagement portion 602a has a contact surface. According to the first embodiment, a narrow edge portion of the engagement portion 602 is brought into contact with the engaged portion 32 (see FIG. 16). On the other hand, according to the present embodiment, the contact surface of the engagement portion 602a is engaged with the engaged portion 32 of the electronic apparatus 30 so that it is possible to prevent damages like abrasion of the electronic apparatus 30 more certainly.

As shown in FIGS. 20 and 21, the urged portion 606a extends downwardly from an edge portion of the locking member 600a. As shown in FIG. 21, the locking member 600a is held by the base member 100a so that the urged portion 606a is located in the retaining portion 116a. The side wall of the retaining portion 116a is provided with a receiver portion 118a. The urged portion 606a of the locking member 600a is constantly urged by the end 804a of the helical torsion coil spring 800 toward the receiver portion 118a.

According to the present embodiment, the urged portion 606a further functions as the rotation regulator which prevents the locking member 600a to pivot undesirably. In detail, when the locking member 600a pivots to the engaged position (see FIGS. 21 and 22), the urged portion 606a is brought into abutment with the receiver portion 118a of the retaining portion 116a so as to prevent the locking member 600a from pivoting beyond the engaged position. When the locking member 600a pivots to the released position (see FIG. 23), the urged portion 606a is brought into abutment with the side surface 119a facing the receiver portion 118a in the Y-direction, so as to prevent the locking member 600a from pivoting beyond the released position.

Referring to FIGS. 27 to 29, the pressed portion 608a according to the present embodiment is formed by folding a part of the locking member 600 similarly to the first embodiment (see FIG. 16). The pressed portion 608a is formed with a pressed surface 610a. The pressed surface 610a is a surface (end surface) which extends obliquely both to the X-direction and the Y-direction when the locking member 600a is located at the engaged position. The pressed surface 610a is configured to be pressed against the pressing portion 304a of the pressing member 300a so that the torque around the pivot portion 604a is applied to the locking member 600a. The torque forces the locking member 600 to pivot from the engaged position shown in FIG. 22 toward the released position shown in FIG. 23. As can be seen from FIGS. 5 and 22, as compared with a positional relation of the pressing portion 304 to the pressed portion 608 according to the first embodiment, the pressing portion 304a according to the present embodiment is located more apart from the pressed portion 608a outwardly in the Y-direction. Referring to FIGS. 31 and 32, the engaged portion 32 has an engaged surface 33. The pivot portion 604a is located at a distance R2 from a point (pressing point) which is positioned on the engagement portion 602a and configured to be brought into abutment with the engaged surface 33. The pivot portion 604a is located at a distance L2 from a point which is positioned on the pressed surface 610a and configured to be brought into abutment with the pressing portion 304a. The locking member 600 has a distance R1 corresponding to the distance R2 and a distance L1 corresponding to the distance L2. As can be seen from FIGS. 30 and 31, the ratio of the distance L2 to the distance R2 (L2/R2) according to the present embodiment is bigger than the ratio of the distance L1 to the distance R1 (L1/R1) according to the first embodiment (i.e. L2/R2>L1/R1). Therefore, when the locking member 600 according to the first embodiment and the locking member 600a according to the present embodiment equally receive same amount of forces so as to be urged to the engaged position (see FIGS. 5 and 22), the pressing point according to the present embodiment can be moved by a small force than the first embodiment. For example, a standard of the latching module may provide a minimum force which should be applied to the engagement portion 602 and 602a so as to keep the locking member 600 and 600a in the engaged position. In such a case, the amount of the minimum force which urges the locking member 600a to the engaged position in the present embodiment is same as the amount of the minimum force in the first embodiment. On the other hand, when the latching module 10a according to the present embodiment is attached to the unit 20a, the amount of the force which is required for the pressing member 300a to force the locking member 600a to pivot (i.e. the force which should be applied to the pressed portion 608a) can be smaller. Therefore, it is possible to make the pressing member 300a and the locking member 600a to be press by each other with small forces so that these members may be reduced in sizes.

Referring to FIGS. 27 and 29, the locking member 600a according to the present embodiment includes a bent portion 613a. The bent portion 613a extends downwardly from an end opposing to the urged portion 606a. The bent portion 613a is twisted and further extends toward the engagement portion 602a. The bent portion 613a is provided with a contact surface 614a. The contact surface 614a is oblique to the Y-direction. As can be seen from FIGS. 18 and 22, when the latching module 10a and the unit 20a are inserted into the electronic apparatus 30, the contact surface 614a is brought into abutment with a corner of a front end of the engaged portion 32. The corner of the front end of the engaged portion 32 slides on the contact surface 614a when the latching module 10a and the unit 20a are kept to be moved into the electronic apparatus 30. According to the first embodiment, a narrow edge portion of the locking member 600 is brought into contact with the engaged portion 32 (see FIG. 15). On the other hand, according to the present embodiment, the part (the contact surface 614a) which is configured to be brought into abutment with the engaged portion 32 is shaped as a surface. Therefore, it is possible to reduce damages like abrasion of the electronic apparatus 30 more certainly than the first embodiment.

Referring to FIG. 27, the locking member 600a is formed with a U-shaped portion 615a. The U-shaped portion 615a extends from an end of the locking member 600a and is bent to extend back along the lower surface of the locking member 600a so that the U-shaped portion 615a has a U-like shaped cross-section. When the locking member 600a is located at the retained position, a lower part of the U-shaped portion 615a is configured to extend along the lower surface of the base member 100a (see FIG. 23) so that the U-shaped portion 615a functions as a part which pretends the locking member 600a from unintentionally moving in the Z-direction (vertical direction) or being shaky.

Figure 30:
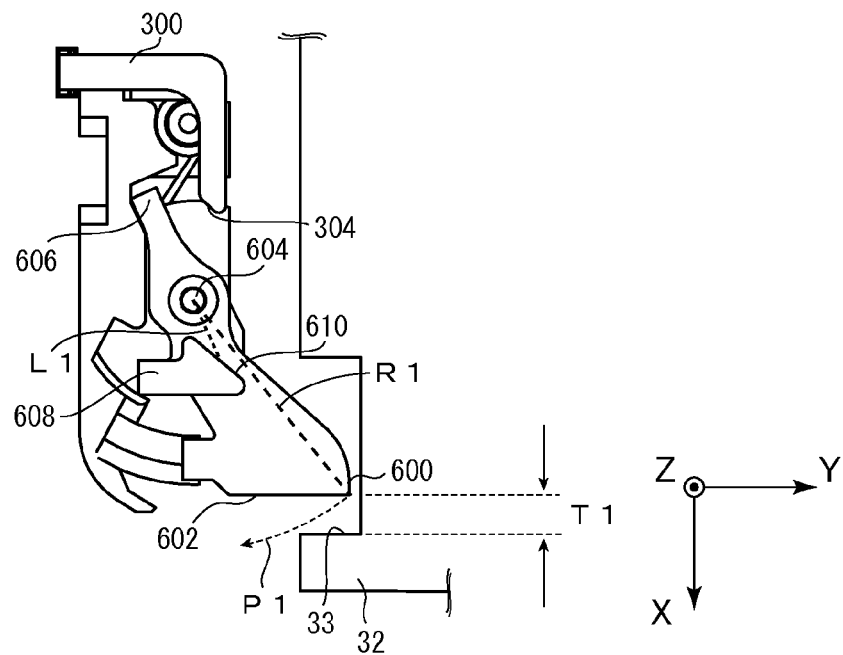
FIG. 30 is a schematic diagram showing a track of a rotational movement of the locking member according to the first embodiment and a distance which is necessary between the locking member and an engaged portion of the electronic apparatus.
Figure 31:
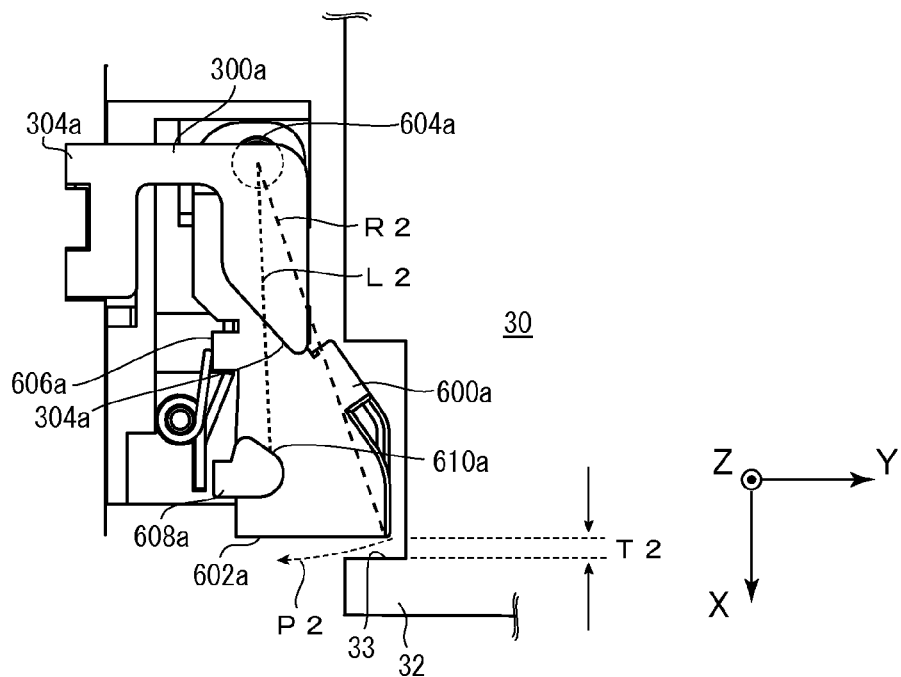
FIG. 31 is a schematic diagram showing a track of a rotational movement of the locking member according to the second embodiment and the distance which is necessary between the locking member and the engaged portion of the electronic apparatus.

As can be seen from FIGS. 30 and 31, the latching modules 10 and 10a according to the embodiments described above should be provided with gaps T1 and T2 between the engagement portions (602 and 602a) and the engaged surface 33 of the engaged portion 32, respectively, so that the locking members 600 and 600a can pivot without obstacles. Lengths of the gaps T1 and T2 should be determined considering tracks P1 and P2 in which the engagement portions 602 and 602a move while the locking members 600 and 600a pivot. As shown in FIG. 30, the engagement portion 602 according to the first embodiment is located at a distance (pivot radius) R1 around the pivot portion 604. As shown in FIG. 31, the engagement portion 602a according to the present embodiment is located at a distance (pivot radius) R2 around the pivot portion 604a. According to the present embodiment, the urged portion 606a is arranged to be located between the pivot portion 604a and the engagement portion 602a so that the distance (pivot radius) R2 can be arranged longer than the distance (pivot radius) R1. Therefore, a variation in the X-direction of the track P2 can be designed to be smaller than that of the track P1, and the gap T2 can be designed to be smaller than the gap T1. As a result, according to the present embodiment, the latching module 10a can be further reduced in size in the X-direction.

The present application is based on a Japanese patent applications of JP2010-049445 and JP2010-147500 filed before the Japan Patent Office on Mar. 5, 2010 and Jun. 29, 2010, respectively, the contents of which are incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A latching module configured to be attached and fixed to a unit, the unit being designed to be detachably installed in an electronic apparatus along a predetermined direction, the electronic apparatus having an engaged portion, the latching module comprising:
    a base member formed with a cam groove, the base member being configured to be fixed to the unit so that the base member is unable to move relative to the unit;
    an operative member supported by the base member so as to be projectable outwardly in the predetermined direction from the base member;
    a locking member having an engagement portion and a pivot portion, the engagement portion being to be engaged with the engaged portion, the locking member being supported by the base member so that the engagement portion is pivotable on the pivot portion from an engaged position to a released position, the engaged position being a position where the engagement portion is able to be engaged with the engaged portion, the released position being a position where the engagement portion is unable to be engaged with the engaged portion;
    a lock urge member arranged to urge the locking member toward the engaged position; and
    a release mechanism designed to force the locking member to pivot on the pivot portion to the released position upon the projection of the operative member.

2. The latching module as recited in claim 1, wherein:
    the release mechanism includes a pressed portion formed on the locking member and a pressing member attached to the operative member, the pressing member being configured to press the pressed portion upon the projection of the operative member so as to force the locking member to pivot toward the released position.

3. The latching module as recited in claim 2, wherein:
    the pressed portion is located between the pivot portion and the engagement portion.

4. The latching module as recited in claim 2, wherein:
    the pressed portion has a pressed surface extending in a plane oblique to the predetermined direction.

5. The latching module as recited in claim 2, further comprising a shell covering, at least in part, the base member, wherein:
    the pressing member is located in the shell when the locking member is located at the engaged position; and
    the pressed portion protrudes, at least in part, out of the shell when the locking member is located at the engaged position.

6. The latching module as recited in claim 1, wherein:
    the locking member is formed with an urged portion, the pivot portion being positioned between the urged portion and the engagement portion; and
    the lock urge member is configured to push the urged portion so that the locking member is urged toward the engaged position.

7. The latching module as recited in claim 1, wherein:
    the locking member is formed with an urged portion, the urged portion being positioned between the pivot portion and the engagement portion; and
    the lock urge member is configured to push the urged portion so that the locking member is urged toward the engaged position.

8. The latching module as recited in claim 6, wherein:
    the lock urge member includes a helical torsion coil spring having opposite ends;
    one of the ends of the helical torsion coil spring is held by the base member; and
    a remaining one of the ends of the helical torsion coil spring presses the urged portion so that the locking member is urged toward the engaged position.

9. The latching module as recited in claim 6, wherein:
    a distance from the pivot portion to the engagement portion is longer than another distance from the pivot portion to the urged portion.

10. The latching module as recited in claim 6, wherein:
    the base member is formed with a retaining portion having an inner wall; and
    the locking member is formed with a rotation regulator retained in the retaining portion of the base member, the rotation regulator being arranged to be brought into abutment with the inner wall of the retaining portion upon a large pivot movement of the locking member so that the locking member is prevented from rotating improperly beyond the engaged position.

11. The latching module as recited in claim 10, wherein:
    the base member is formed with a receiver portion which receives the urged portion when the rotation regulator is brought into abutment with the inner wall of the retaining portion.

12. The latching module as recited in claim 11, wherein:
    the pivot portion is located between the rotation regulator and the urged portion.

13. The latching module as recited in claim 1, wherein the locking member is made of a metallic material.

14. The unit which the latching module as recited in claim 1 is attached and fixed to.

15. An electronic apparatus in which the unit as recited in claim 14 is detachably installed.

* * * * *